(No Model.)
H. T. JOHNSON.
GALVANIC BATTERY.
No. 539,871. Patented May 28, 1895.
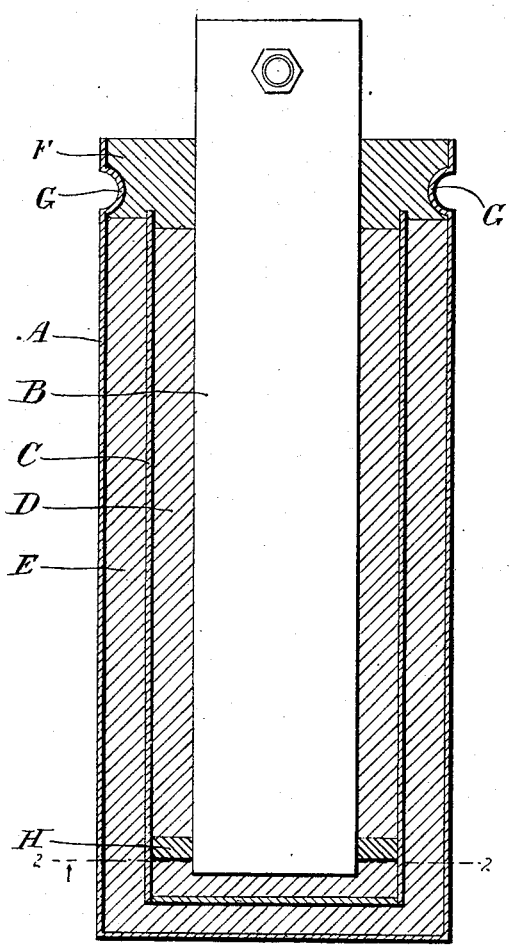
WITNESSES:
F. B. Packard
W. W. Shaw
INVENTOR
Harry T. Johnson
BY
Murphey & Metcalf
ATTORNEYS.
THE NORRIS PETERS CO., PHOTO-LITHO., WASHINGTON, D. C.

UNITED STATES PATENT OFFICE.

HARRY T. JOHNSON, OF NEW YORK, N. Y.

GALVANIC BATTERY.

SPECIFICATION forming part of Letters Patent No. 539,871, dated May 28, 1895.

Application filed November 10, 1893. Serial No. 490,561. (No model.)

*To all whom it may concern:*

Be it known that I, HARRY T. JOHNSON, a citizen of the United States, and a resident of the city, county, and State of New York, have invented certain new and useful Improvements in Galvanic Batteries, of which the following is a full, clear, and exact description, reference being had to the accompanying drawing, forming part of this specification.

My invention relates to that form of galvanic batteries or cells popularly known as "dry batteries," in which the positive electrode, serving as a containing vessel for the cell, is covered with a layer of wax or other similar substance for the purpose of hermetically sealing the cell and preventing the evaporation of the moisture contained therein. If this seal be accidentally fractured, and this frequently happens especially in shipping the cells to distant points, not only will the hermetic function of the seal be destroyed, but as it is impossible to keep the cells in a vertical position at all times, especially in transportation, the pieces of the seal will fall out of the cell and thus deprive the upper end of the negative electrode of the support which the seal provides.

The object of my invention is to remedy these defects in galvanic cells of the character described, as heretofore constructed, and to this end it consists in the provision of means for holding the seal in place even should it become accidentally fractured, and at the same time lessening the liability of fracture by strengthening the upper part of the containing vessel without increasing its weight or thickness.

The accompanying drawing represents a vertical central section of a cell embodying my invention.

In said drawing, A designates the positive electrode, which is preferably constructed in the form of a hollow cylinder or cup of zinc open at the top. The negative electrode B, which is usually formed of carbon, occupies a central axial position in the center of the porous cup or cylinder C, which is preferably formed of heavy absorbent paper such as blotting paper. The space between the negative electrode B and the side of the porous cup C is filled with a depolarizing compound D, such as pulverized carbon, or a mixture of pulverized carbon and peroxide of manganese, firmly packed in place. The space between the porous cup C and the interior of the cup shaped positive electrode is filled with an exciting compound E. This is usually made by dissolving sal ammoniac in water and then mixing sufficient plaster of paris therewith to cause the mass to set and form a semisolid substance when poured into place.

Over the top of the cup C and the positive electrode, hot wax or bitumen or other suitable substance is poured, sufficient space being left for that purpose, which hardens and forms a hermetic seal F for the cell.

The upper end of the positive electrode A, with which the seal F is in contact, is bent inwardly so as to form a bead or projection G which preferably extends entirely around the electrode, and which engaging with the seal F, firmly secures the seal in the top of the electrode and prevents its detachment, even should the seal become cracked by careless handling. The projection G also stiffens the top of the electrode sufficiently to prevent the fracturing of the seal under ordinary conditions of handling, and this desirable feature is attained without any increase in the weight of the electrode, which can be made of thin sheet zinc rolled into cylindrical form.

Having thus shown and described my invention, what I claim as new, and desire to secure by Letters Patent, is—

In a galvanic battery, the combination of a metal containing vessel forming the positive electrode, a negative electrode therein, a semisolid filling between the positive and negative electrodes, a seal closing the top of the positive electrode, and a projection extending along the upper part of the positive electrode and engaging with said seal, said projection being formed by bending or rolling the electrode, thereby increasing its rigidity without adding to its weight and permitting the electrode to be rolled into cylindrical form from thin sheet metal, substantially as shown and described.

HARRY T. JOHNSON.

Witnesses:
S. G. METCALF,
WM. W. SHAW.